US010990619B1

United States Patent
Kuyda et al.

(10) Patent No.: US 10,990,619 B1
(45) Date of Patent: Apr. 27, 2021

(54) MULTI-TIER CONVERSATIONAL ARCHITECTURE WITH PRIORITIZED TIER-DRIVEN PRODUCTION RULES

(71) Applicant: Luka, Inc., San Francisco, CA (US)

(72) Inventors: Eugenia Kuyda, San Francisco, CA (US); Philipp Dudchuk, San Francisco, CA (US); Konstantin Abakumov, Moscow (RU); Oleg Baranov, Moscow (RU); Artem Rodichev, San Francisco, CA (US)

(73) Assignee: Luka, Inc., San Francisco, CA (US)

( * ) Notice: Subject to any disclaimer, the term of this patent is extended or adjusted under 35 U.S.C. 154(b) by 144 days.

(21) Appl. No.: 16/132,601

(22) Filed: Sep. 17, 2018

Related U.S. Application Data

(60) Provisional application No. 62/567,867, filed on Oct. 4, 2017.

(51) Int. Cl.
  *G06F 16/332* (2019.01)
  *G10L 15/28* (2013.01)
  *H04L 12/58* (2006.01)
  *G06F 16/31* (2019.01)

(52) U.S. Cl.
  CPC ........ *G06F 16/3329* (2019.01); *G06F 16/313* (2019.01); *G10L 15/28* (2013.01); *H04L 51/02* (2013.01)

(58) Field of Classification Search
  CPC ... G06F 16/3329; G06F 16/313; G10L 15/28; H04L 51/02
  See application file for complete search history.

(56) References Cited

U.S. PATENT DOCUMENTS

| | | | | |
|---|---|---|---|---|
| 10,521,466 | B2* | 12/2019 | Bellegarda | G06F 16/335 |
| 2012/0041903 | A1* | 2/2012 | Beilby | H04L 51/02 |
| | | | | 706/11 |
| 2014/0201125 | A1* | 7/2014 | Moeinifar | G06N 5/02 |
| | | | | 706/47 |
| 2016/0352656 | A1* | 12/2016 | Galley | G06N 3/0454 |

(Continued)

OTHER PUBLICATIONS

C. A. Dowler, "Do You Have A Life Events Checklist," ManifestYourPotential.com, Wayback Machine copy Nov. 24, 2016, "http://www.manifestyourpotential.com/life/make_sense_of_life/life_lessons_events/life_events/topic_life_events_checklist.htm" last accessed May 6, 2020, 8 pages (Year: 2016).*

*Primary Examiner* — Michelle M Koeth
(74) *Attorney, Agent, or Firm* — Muirhead and Saturnelli, LLC

(57) ABSTRACT

A chatbot maintains a conversation with a user by providing a plurality of separate conversational tiers that allow the chatbot to interact with the user, each of the conversational tiers having a set of production rules that are independent of production rules for other ones of the tiers. The production rules indicate a flow of conversation between the user and the chatbot. The chatbot selects one of the conversational tiers based on previous conversational tiers used by the chatbot in connection with conversing with the user and based on content of conversations between the user and the chatbot. The chatbot responds to statements of the user according to a specific production rule that is chosen by the chatbot based on a particular one of the conversational tiers that has been selected and based on other factors. A scripting engine may match statements of the user with specific production rules.

22 Claims, 4 Drawing Sheets

System flow diagram

(56) References Cited

U.S. PATENT DOCUMENTS

| | | | |
|---|---|---|---|
| 2017/0228520 A1* | 8/2017 | Kidd | G16H 20/13 |
| 2017/0250930 A1* | 8/2017 | Ben-Itzhak | G06F 3/011 |
| 2018/0331979 A1* | 11/2018 | Rakovitsky | H04L 51/046 |
| 2018/0353108 A1* | 12/2018 | Prate | H04L 67/22 |

* cited by examiner

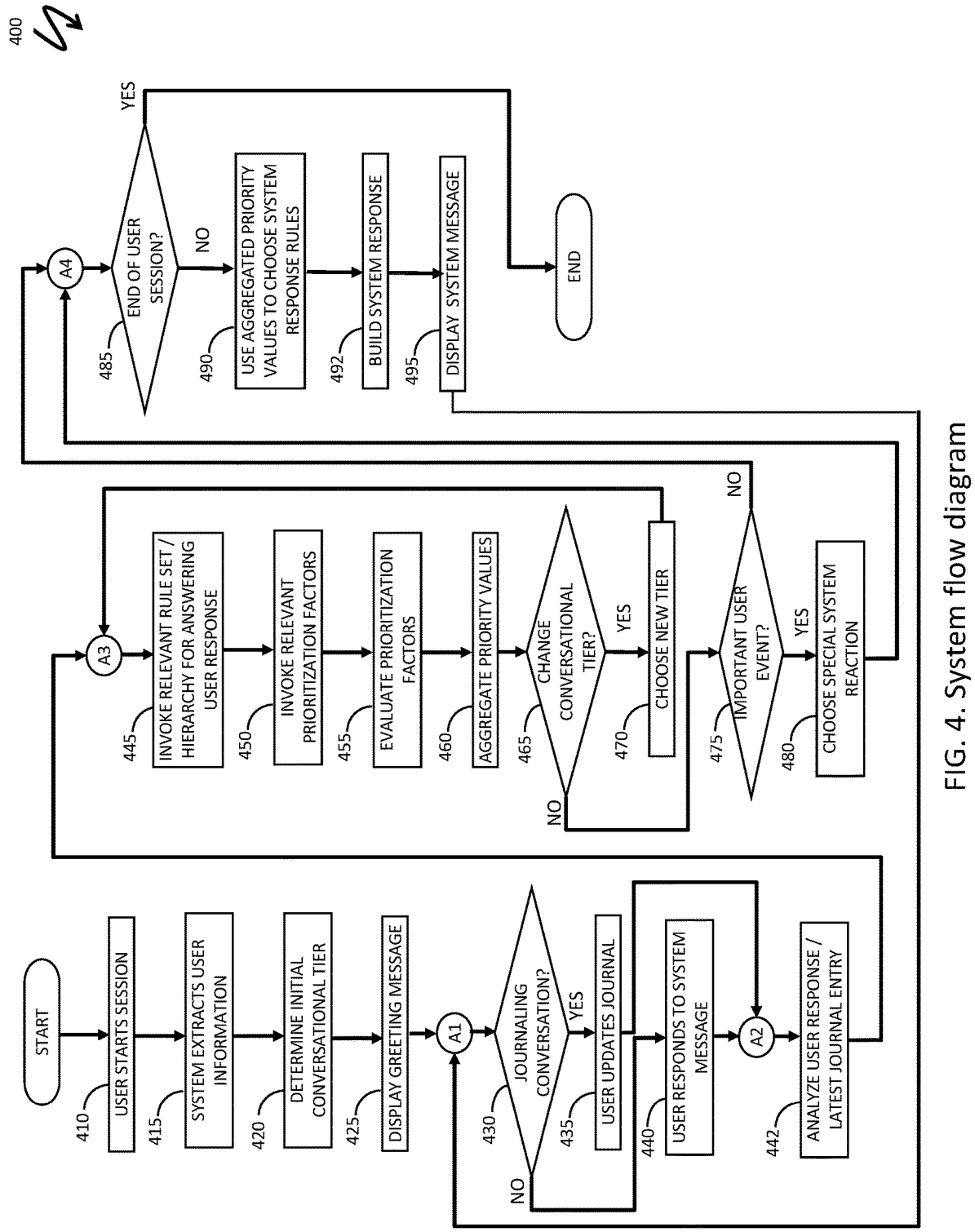
FIG. 4. System flow diagram

MULTI-TIER CONVERSATIONAL ARCHITECTURE WITH PRIORITIZED TIER-DRIVEN PRODUCTION RULES

CROSS-REFERENCE TO RELATED APPLICATIONS

This application claims priority to U.S. Prov. App. No. 62/567,867, filed on Oct. 4, 2017, and entitled "MULTI-TIER CONVERSATIONAL ARCHITECTURE WITH PRIORITIZED TIER-DRIVEN PRODUCTION RULES", which is incorporated herein by reference.

TECHNICAL FIELD

This application is directed to the field of artificial conversational entities for everyday communications with users, and more particularly to the field of multi-tier conversational architecture with prioritized tier-driven productions rules.

BACKGROUND OF THE INVENTION

The market for Artificial Conversation Utilities (ACEs, chatbots) is growing at an accelerated pace, representing a booming software area for applied Artificial Intelligence (AI). According to various 2017-2018 industry statistics and forecasts, the global chatbots market is expected to reach $1.25-$2.16 Billion by 2024-2025, growing at a Compound Annual Growth Rate (CAGR) of 24.3%-28.7%. In all forecasts, North America is the largest part of the market. It is also estimated that broad proliferation of chatbots may revolutionize existing labor markets and change core requirements to the new workforce, while saving as much as 25%-30% on manpower costs over the next decade, warranting the need to invest upon skill upgrading and next generation technologies rather than routine processes, especially in various types of services.

Experts subdivide global chatbots market into three main segments: support chatbots, skills chatbots, and assistant chatbots, each segment applicable for many end user segments, such as BFSI (Banking, Financial services and Insurance), healthcare, e-commerce, retail, travel and hospitality, media & entertainment, etc.

The adoption of chatbots is spearheaded by major social networks and technology companies, including Facebook, Slack, Microsoft, IBM Watson, Twitter, Snapchat, Kik, Nuance, Creative Virtual and many others. These companies have well identified the potential of chatbots and are offering quickly evolving and comprehensive development platforms. The majority of successful chatbots run in popular messaging applications and use social and professional networks to reach their users. Thus, of the seven best 2016 chatbots awarded by the ChatBottle search engine, five were predominantly running in Facebook Messenger and one in Slack.

At this early stage of chatbots market, many chatbot applications are designed as single purpose digital assistants serving customer needs in particular areas. A 2017 Chatbot Survey by Mindbowser and ChatbotsJournal has identified five top chatbots markets as e-Commerce, Insurance, Healthcare, Retail and Hospitality (the five industries that received over 50% of survey participant votes), while the two business functions that received over half of the votes turned to be Customer Support and Sales/Marketing. Of the dozen suggested platforms/networks where future chatbots may be running, only three items gained majority approval: Facebook Messenger, each business's own website, and Slack.

A significant factor driving adoption of chatbots is a realization, increasingly supported by usage statistics, that chatbots enjoy higher user retention rates compared with less interactive mobile, web and desktop applications. In the above survey, a consensus estimate of an average of today's chatbots retention rate after one month of usage was 40-60%, compared with 20-40% for applications. Advanced chatbots systems, such as Octane AI, achieve engagement rates up to 70-90% by employing intelligent user engagement strategies, such as push notifications, utilizing User Generated Content, etc.

Notwithstanding significant advances in chatbots development and usage, many aspects of their design and functioning require improvements. Ninety percent of participants of the 2017 Chatbot Survey note that chatbots are lacking intelligence and over 70% consider conversational capabilities of chatbots insufficient. Many experts agree that the majority of currently functioning chatbots are far from being user friendly and do not behave in a human-like manner, which makes chatbots unfit as lifestyle tools.

Accordingly, it is desirable to create a new generation of user friendly chatbots with high retention rates and increased intelligence and conversational capabilities.

SUMMARY OF THE INVENTION

According to the system described herein, a chatbot maintains a conversation with a user by providing a plurality of separate conversational tiers that allow the chatbot to interact with the user, each of the conversational tiers having a set of production rules that are independent of production rules for other ones of the tiers, the production rules indicating a flow of conversation between the user and the chatbot, the chatbot selecting one of the plurality of conversational tiers based on previous conversational tiers used by the chatbot in connection with conversing with the user and based on content of conversations between the user and the chatbot, and the chatbot responding to statements of the user according to a specific production rule that is chosen by the chatbot based on a particular one of the conversational tiers that has been selected and on user level and depth of knowledge about the user, answers already used by the chatbot during a session, keywords extracted from a user message and other linguistic properties of the message, specific topics and keywords that the user brought up in a previous session, and/or personal profile data of the user. The conversational tiers may include a Small Talk Tier to create illustrate general capabilities of the chatbot to the user, a Get to Know You tier that captures knowledge about the user along with user preferences and habits, and a Journaling Conversation tier in which the user is prompted to talk about what the user did during the day as well as current mood and feeling. The chatbot may use the Small Talk tier when the user first converses with the chatbot. The chatbot may identify and provide responses for significant events of the user. The significant events of the user may include marriage, baby birth, purchasing a new house, vacation, a birthday of the user, a business meeting, a business trip, a job promotion, a start of a new job and quitting an old job. Significant events may be extracted from user messages, user profile data, and/or conversation history. Identification of significant events may be based on fuzzy matching of a user input message onto a set of sample messages defining various circumstances and events. Each of the production rules may include a set of conditions that are matched to conversation of the user and a resulting conversational portion that is provided by the chatbot when a corresponding one of the rules is selected. A particular rule may be selected in response to the particular rule satisfying a greatest number of conditions without any of the conditions of the particular rule being false. The production rules may include basic rules with no variables and schematic rules that use variable conversation portions. A basic rule may include a response that refers to notions that were mentioned in a previous conversation. A particular one of the variable conversation portions may be chosen based on content of the statements of the user. The content of the statement of the user may be analyzed using a selective conversational model trained on quality pairs of input and output messages that ranks a plurality of alternative responses based on a specific user message that contains a particular word or phrase. At least some of the responses for schematic rules may be synthesized using machine learning and natural language processing. A scripting engine may match statements of the user with specific production rules. The scripting engine may cause transitions to a different conversational tier based on conditions that are not satisfied in a current conversational tier.

According further to the system described herein, a chatbot that maintains a conversation with a user includes a non-transitory computer-readable medium containing data for a plurality of separate conversational tiers that allow the chatbot to interact with the user, each of the conversational tiers having a set of production rules that are independent of production rules for other ones of the tiers, the production rules indicating a flow of conversation between the user and the chatbot and includes executable code provided in the non-transitory computer readable medium, the executable code selecting one of the plurality of conversational tiers based on previous conversational tiers used by the chatbot in connection with conversing with the user and based on content of conversations between the user and the chatbot and the executable code responding to statements of the user according to a specific production rule that is chosen by the chatbot based on a particular one of the conversational tiers that has been selected and on user level and depth of knowledge about the user, answers already used by the chatbot during a session, keywords extracted from a user message and other linguistic properties of the message, specific topics and keywords that the user brought up in a previous session, and/or personal profile data of the user. The conversational tiers may include a Small Talk Tier to create illustrate general capabilities of the chatbot to the user, a Get to Know You tier that captures knowledge about the user along with user preferences and habits, and a Journaling Conversation tier in which the user is prompted to talk about what the user did during the day as well as current mood and feeling. The chatbot may use the Small Talk tier when the user first converses with the chatbot. The chatbot may identify and provide responses for significant events of the user. The significant events of the user may include marriage, baby birth, purchasing a new house, vacation, a birthday of the user, a business meeting, a business trip, a job promotion, a start of a new job and quitting an old job. Significant events may be extracted from user messages, user profile data, and/or conversation history. Identification of significant events may be based on fuzzy matching of a user input message onto a set of sample messages defining various circumstances and events. Each of the production rules may include a set of conditions that are matched to conversation of the user and a resulting conversational portion that is provided by the chatbot when a corresponding one of the rules is selected. A particular rule may be selected in response to the particular rule satisfying a greatest number of conditions without any of the conditions of the particular rule being false. The production rules may include basic rules with no variables and schematic rules that use variable conversation portions. A basic rule may include a response that refers to notions that were mentioned in a previous conversation. A particular one of the variable conversation portions may be chosen based on content of the statements of the user. The content of the statement of the user may be analyzed using a selective conversational model trained on quality pairs of input and output messages that ranks a plurality of alternative responses based on a specific user message that contains a particular word or phrase. At least some of the responses for schematic rules may be synthesized using machine learning and natural language processing. A scripting engine may match statements of the user with specific production rules. The scripting engine may cause transitions to a different conversational tier based on conditions that are not satisfied in a current conversational tier.

The proposed AI Friend conversational system offers a user friendly multi-tier conversational architecture representing a Small Talk tier, a Get to Know You tier for capturing knowledge about user, user preferences and habits, a Journaling Conversation tier where the user is prompted to talk about their day, current mood and feeling, and a permanently present Important Reactions tier for identifying and adequately responding to significant user events. Conversational capabilities of each tier are built upon a hierarchy of production rules representing basic, selective and generative rule types, dynamically assessed and prioritized using a prioritization scheme that is continuously ranking and aggregating multiple prioritization factors that may be reflecting user and system status, conversational history, and experiences. A conversational session of a user is pushed ahead by a scripting engine that includes interrelated small scripts, each responsible for a custom reaction of the AI Friend system to a specific user message depending on various factors and on a particular conversational tier; during a session, the system may switch between the conversational tiers, following decision points that switch between rules and other directions embodied within scripts.

System functioning is explained in more detail below:
1. When a new user starts a first conversational session, the user may be initially presented with Small Talk conversation to create a general awareness about the system capabilities and the user interface and build an initial trust level between the user and the system. At the Small Talk conversation phase, repetitive and non-specific system messages are allowed and conversation scenarios on different days may be quite similar (such as weather or health talk). Specifics of the Small Talk conversation phase may depend on a user profile, age, gender, home town, season, time of the day, etc. The system may be informed by external data sources to make the small talk more vivid based on various user data, including personal information such as location. For example, if a conversation with a Californian occurs around January (the season of frequent massive rains and flooding in the state), the AI Friend may ask the user within the Small Talk tier whether the user is close to a flooding zone or if there is a risk of flooding nearby.
2. The system may permanently use the Important Reactions tier to recognize significant user events and situations, such as a marriage, baby birth, purchasing a new house, vacation, birthday (detected automatically once user profile is known), business meeting, business trip, job promotion, start of a new job, quitting an old job, etc. The system may extract significant events directly from user messages or from user profile data and/or conversation history and may respond to significant events specifically and with emphasis (which may be reflected, for example, in displaying mojos or special shapes of messaging boxes), possibly requesting additional information (which the system may analyze, providing a thoughtful generic response to the additional information). Identification of special circumstances and events may be based on fuzzy matching of a user input message onto a set of sample messages defining various circumstances and events, and evaluating similarity of the input with the closest sample message using a similarity evaluation function (for example, a cosine similarity function over vector representations of messages), on the system vocabularies and NLP (Natural Language Processing) feature-based classification models or directly on keywords extracted from a user input message; it may be different for different locations of the user and their local time and may further depend on the user profile (age, social and marital status, etc.).

3. Once the user feels well versed in the capabilities of the Small Talk tier and the system becomes aware of that using various assessment methods, such as response speed, versatility or ease of switching topics, the AI Friend may switch the conversation, possibly within the same user session, to the more profound Get to Know You tier for learning about the user's life, preferences and habits. Conversational interface and rules for this tier may significantly different from the Small Talk tier. The conversational interface and rules may represent more of a "survey" where the user is asked open-ended questions about preferences and habits, such as favorite music genres, performers and bands/orchestras, food, travel, political and other preferences, daily routines, etc. Such system messages/questions are rarely, if ever, repeated without significant modifications, and information obtained at this level is memorized by the system and substantially used for further conversations with the user at any tier.

4. A portion of users may establish such rapport with the AI Friend, which constantly gets closer by adapting behavior and conversations to preferences and habits of the users, that the users may entrust the system with the users' deeper thoughts and intentions by entering the Journaling Conversations tier. Here, users may add journal entries with certain regularity, assisted by non-invasive system messaging that may have several different flavors: setting up an agenda for a typical journal entry, reminding users about previous records, and analyzing journal entries in search of significant patterns yet unknown to the system or emphasizing/modifying already existing patterns.

5. It is empirically known from early experiments with the system that entering by users the Journaling Conversation tier strongly correlates with high retention ratios. Therefore, driving users to the Journaling Conversation tier is much desired for advanced uses of the system.

6. Users who are comfortably using AI Friend may be offered commercial applications (chatbots add-ons) by various chatbots providers. High user retention within the AI Friend may be a good early indicator of success of such add-ons.

At every conversational step, the AI Friend determines the best production rule to build a response to user message. Such determination is flexible and dynamic and may depend on a variety of contextual factors, such as:
   current conversational tier
   user level and depth of knowledge about the user accumulated by the system
   answers already used by the system during a session
   keywords extracted from a user message and other linguistic properties of the message
   specific topics & keywords that the user brought up in the previous session
   personal data from the user profile, etc.

The system's rule based conversational engine supports two different types of rules—basic rules and schematic rules. In the examples below, specific content is boldfaced, while variable conditions are italicized. For example, a set of responses
   hey→hello|hi
represents a basic rule, whereas each of the production rules
   *user message has a question* & *today is a weekend day*→<selected response> or
   *user level is more than N*→<generated response>
indicate a schematic rule.

Unlike basic rules, the right part of a schematic rule contains a variable instead of a specific response. The value of the variable is defined in a given dialog context by an external conversational model, which may be selective or generative. The left part of a basic or a schematic rule has a set of conditions that describe the above-mentioned contextual factors. In any given dialog context, the system may select a most specific rule, i.e. a rule that satisfies the highest number of the conditions of the rule listed in the left part of the rule. If the left part of the rule has a condition that is false, the rule will not be selected, no matter how many other conditions are satisfied.

The following is an example of a set of basic rules:
(1) a. hi & *current time is between 6 PM and 12 AM*→Good evening.
   b. hi & *current time is between 12 PM and 6 PM*→Good afternoon.
   c. hi & *current time is between 6 AM and 12 PM*→Good morning.
   d. hi→Hello there.

If the user says hi at 7 AM, the system will select the rule (1c) as the rule (1c) satisfies the highest number of conditions (two) and doesn't violate any conditions listed in a left part of the rule. If the same conversation takes place at 2 AM, the system will pick a default rule, rule (1d), with only one condition that holds, as all the other rules have conditions that are violated when the time is 2 AM.

Another example of a basic rule that makes a conversation more personal and engaging may refer to notions that were mentioned in the previous conversation:
(2) a. hi & *user mentioned biology test in a previous session*→
   →Hey! How was your biology test?
   b. hi→Hello there.

With an alternative described in the rule (2), a user who brought up a biology test in the previous conversation will get a more personal response based on the rule (2a). Other users will be serviced with the response from (2b).

An example of a schematic rule may refer to a response picked by a selective conversational model from five alternatives:

(3) <user message contains hey>→
→Hey, what's up?|How are you doing?|Doing great, you?|I'm cool!|Good night.

A selective conversational model trained on quality pairs of input and output messages may rank the five alternative and pick a best response for a specific user message that contains the word "hey". Depending on a specific message, this rule may produce a variety of outputs:

(4) a. User: Hey, what's up
    b. System: Doing great, you?
(5) a. User: Hey, I got to go, bed time for me
    b. System: Good night
(6) a. User: Hey
    b. System: Hey, what's up?

A similar example may be constructed for a schematic rule that exploits a generative conversational model instead of a selective one.

Here's an example of a set of rules based on the current tier of the conversation:

(7) a. <Journaling started & user message doesn't contain a question>→
    →Anyway. Let me ask you about your day?
    b. <Small Talk ended & user message doesn't contain a question>→
    →Awesome. So what would you like to talk about today?

The rules in (7) may be applied in the beginning of a conversation in a Journaling tier (7a) and in the end of a conversation in the Small Talk tier (7b), no matter what the user said, unless the user had asked a question.

BRIEF DESCRIPTION OF THE DRAWINGS

Embodiments of the system described herein will now be explained in more detail in accordance with the figures of the drawings, which are briefly described as follows.

FIG. 4 is a system flow diagram illustrating system functioning in connection with a multi-tier conversational session, according to an embodiment of the system described herein.

DETAILED DESCRIPTION OF VARIOUS EMBODIMENTS

The system described herein provides an architecture and technique for multi-tier conversations with users based on hierarchical production rules with a multi-factor prioritization scheme and driven by a scripting engine dynamically choosing appropriate questions and answers by the system and switching as necessary between the conversational tiers.

Figure 1:
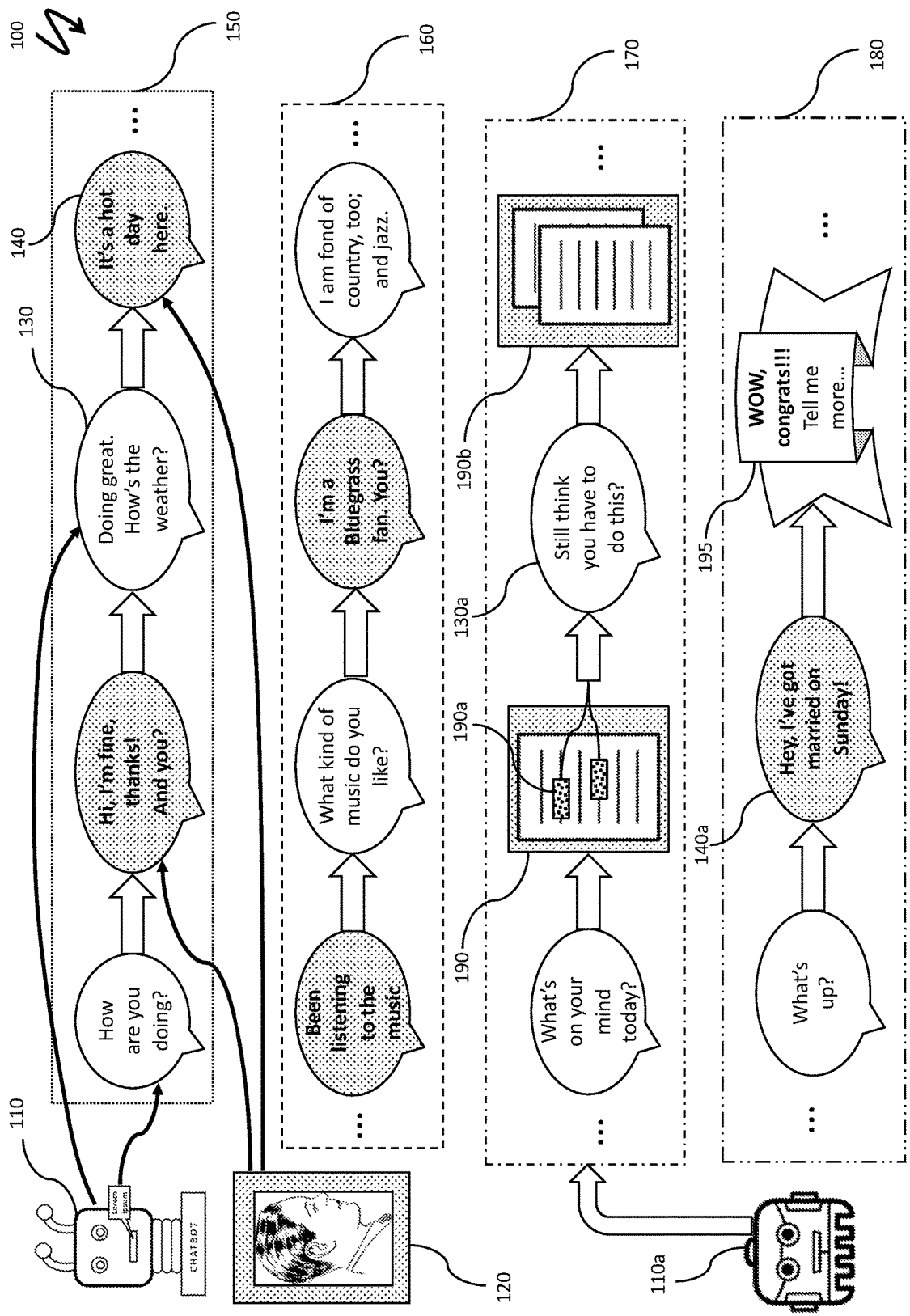
FIG. 1 is a schematic illustration of a multi-tier conversational architecture, according to an embodiment of the system described herein.

FIG. 1 is a schematic illustration 100 of the multi-tier conversational architecture. A chatbot 110 and a user 120 converse via chatbot messages 130 and user messages 140 within four conversational tiers: a Small Talk tier 150, a Get to Know You tier 160, a Journaling Conversations tier 170 and an always-on Important Reactions tier 180, as explained elsewhere herein. The system may switch between the tiers 150, 160, 170, 180 during a conversational session or at a start of a new session. At the permanently present Important Reactions tier 180, the system may recognize an important user message 140*a* and may respond with a special reaction and message format 195. At the Journaling Conversations tier 170, the user may keep one or multiple journals 190. The system may analyze journal records and identify embedded action items or other fragments 190*a* that invite feedback from the system. Accordingly, the system may provide special messages 130*a* in the course of journaling conversations, which the user may take care of in subsequent journal records 190*b*. Additionally, other commercial chatbots 110*a* may be plugged into the system and assist (and take advantage of) the multi-tier conversational workflow. An example of such a chatbot 110*a* may be a journaling assistant that offers advanced formatting, editing and organizational options for journal entries and pages.

Figure 2:
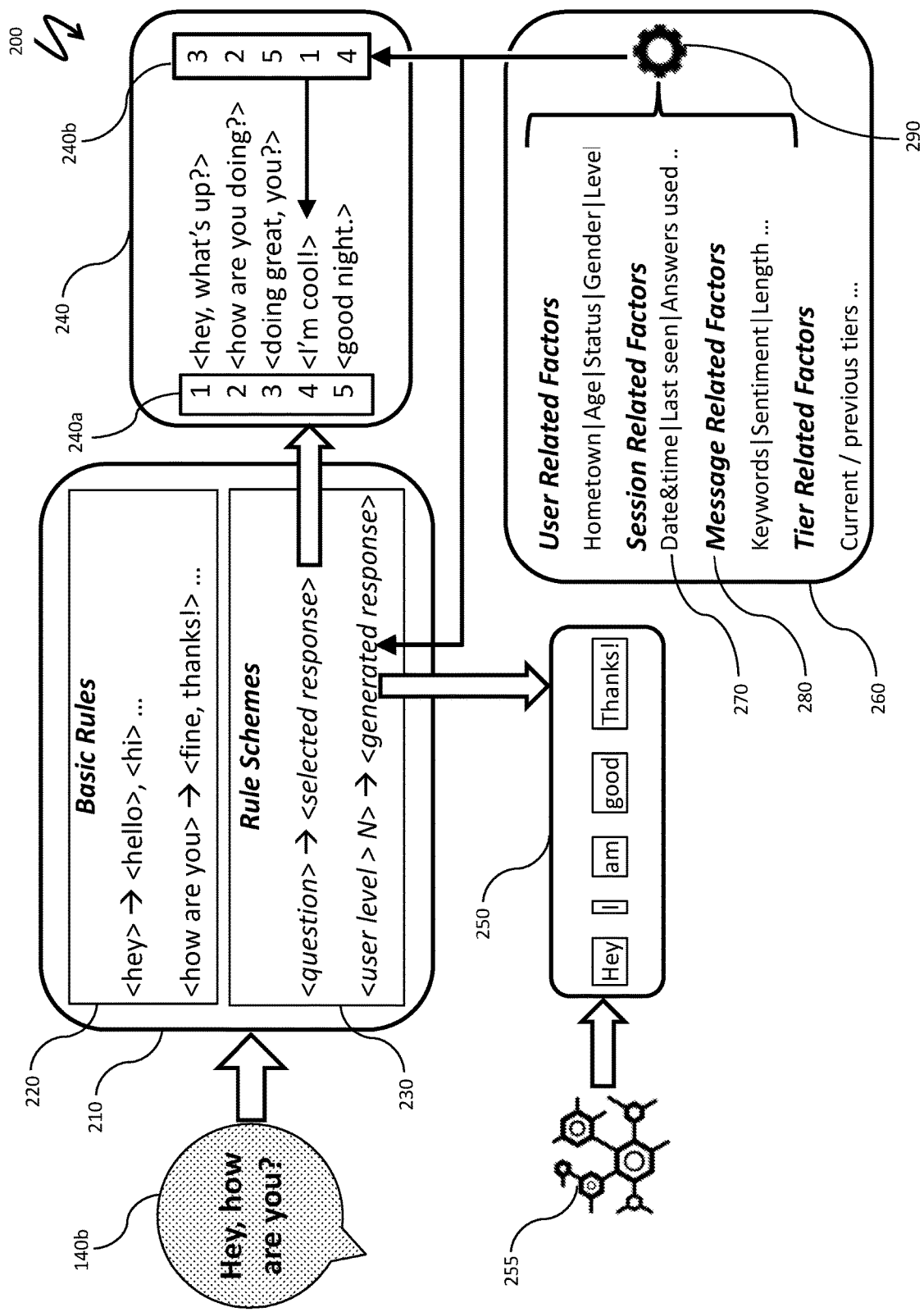
FIG. 2 is a schematic illustration of a structure, hierarchy and prioritization of production rules, according to an embodiment of the system described herein.

FIG. 2 is a schematic illustration 200 of the structure, hierarchy and prioritization of production rules. When a user message, such as a question 140*b*, enters the system, the system must provide an answer. Hierarchy of production rules 210 designed for that purpose have two layers: Basic Rules 220 and Rule Schemes 230. The Basic Rules 220 are built directly on keywords found in the user message 140*b* or other portions of a conversational session and include standard canned answers to questions, as illustrated by the content of the box of the Basic Rules 220.

Rule Schemes may include two different types of productions rules:
- Selective Rules 240 that have the structure <question>→<selected response> and
- Generative Rules 250 where responses to more experienced, high level users may be synthesized using Machine Learning 255 and Natural Language Processing.

A selective rule has multiple alternative responses to the <question> portion of the rule, as illustrated by the text box of the Selective Rules 240. A prioritization (ordering) 240*a* of responses may be subject to continuous reevaluation by the prioritization scheme 260. Dynamic priorities of various responses may depend on multiple factors 270, potentially grouped into categories 280, reflecting user, session, message and conversational tier related aspects, potentially with different weights and roles of various groups and individual factors. Such dynamic reevaluation may be used by a prioritization engine 290 to build altered priorities 240*b* and to select a response to a question based on such altered priorities; thus, an item originally numbered 4 in the prioritization 240*a* may be elevated to a top response in an altered version of the prioritization 240*a* by the prioritization engine 290.

Figure 3:
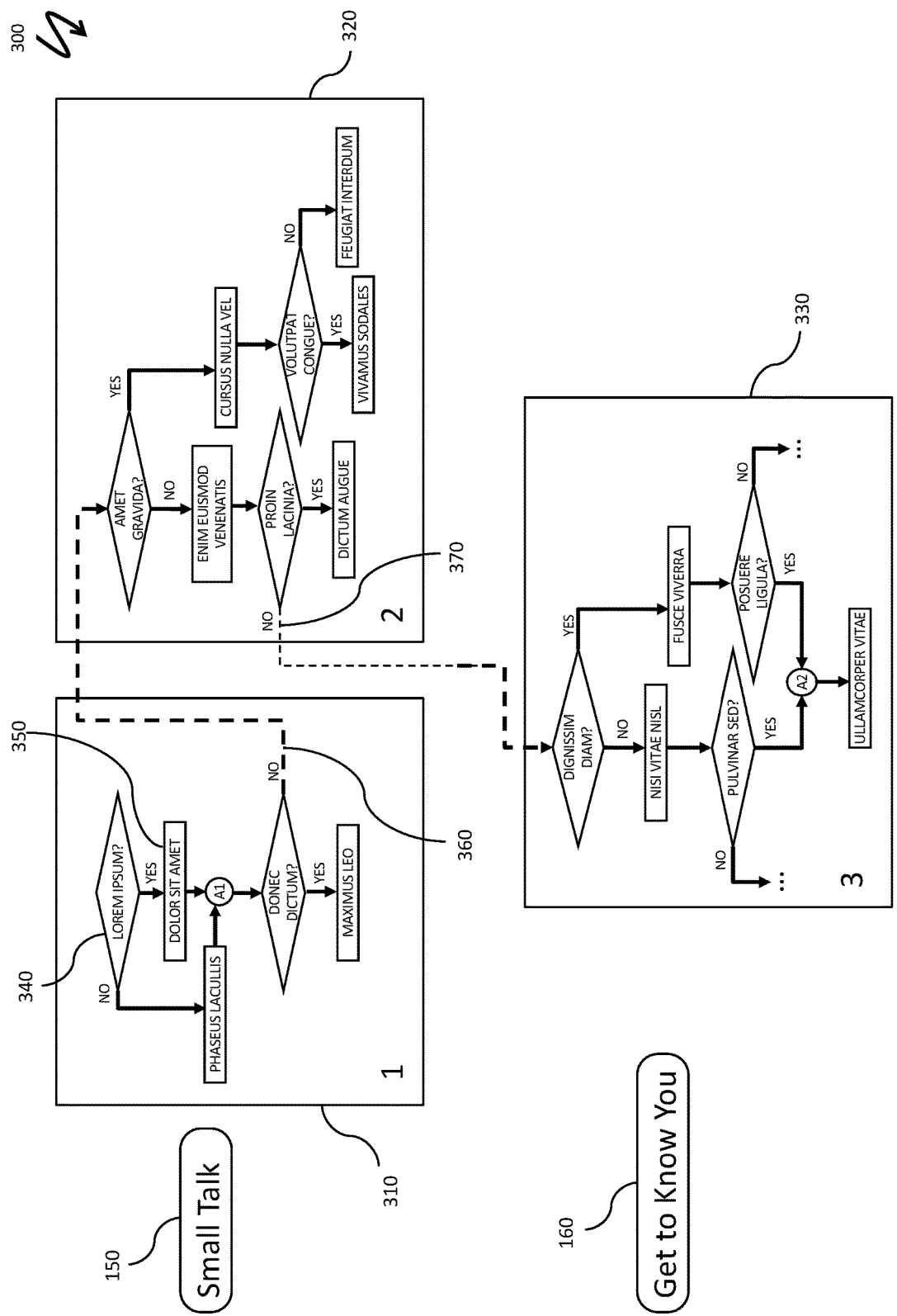
FIG. 3 is a schematic illustration of a conversational scripting engine, according to an embodiment of the system described herein.

FIG. 3 is a schematic illustration 300 of a conversational scripting engine. Functioning of the scripting engine, the driver of a conversational session, as explained elsewhere herein, is exemplified by three scripts 310, 320, 330. The scripts 310, 320 belong to the Small Talk tier 150 and the script 330 functions at the Get to Know You tier 160 (see FIG. 1 for details on the conversational tiers).

Each of the scripts 310, 320, 330 may be interpreted as a decision tree where conditions 340 are sequentially checked and production rules 350 are chosen in response to each particular decision outcome (see FIG. 2 and the accompanying text for details on production rules; note that in FIG. 3 all scripts have only binary Yes/No decision outcomes). Occasionally, a decision outcome may not belong to the scope of a particular script, in which case the currently active script may transfer control over the conversational session to an adjacent script within the same conversational tier (e.g., a connection 360 transfers control from the script 310 to the script 320, both of the scripts 310, 320 serving the same conversational tier 150) or may switch to a script at a different conversational tier (e.g., a connection 370 transfers control from a the script 320 serving the conversational tier 150 to the script 330 serving the conversational tier 160).

Referring to FIG. 4, a system flow diagram 400 illustrates system functioning in connection with a multi-tier conversational session. Processing begins at a step 410, where a user starts a conversational session. After the step 410, processing proceeds to a step 415, where the system extracts user information from the profile and from previous sessions. After the step 415, processing proceeds to a step 420, where the system determines an initial conversational tier (see FIG. 1 for details). After the step 420, processing proceeds to a step 425, where the system displays a greeting message. After the step 425, processing proceeds to a test step 430, where it is determined whether the current conversational tier is a Journaling Conversation. If so, processing proceeds to a step 435, where the user may update or augment journal entries. Otherwise, processing proceeds to a step 440, where the user responds to the current system message.

After each of the steps 435, 440, processing proceeds to a step 442, where the system analyzes a user response or a latest journal entry. After the step 442, processing proceeds to a step 445, where a system script invokes a relevant rule set or hierarchy for answering a most recent user response or for commenting or asking questions regarding the latest journal entry. After the step 445, processing proceeds to a step 450, where the system invokes relevant prioritization factors, as explained elsewhere herein (see, in particular, FIG. 2 and the accompanying text for the prioritization scheme). After the step 450, processing proceeds to a step 455, where the prioritization scheme aggregates the current priority values. After the step 460, processing proceeds to a test step 465, where it is determined whether the conversational tier must be changed. If so, processing proceeds to a step 470, where a new tier is chosen. After the step 470, processing proceeds to a step 445, which may be independently reached from the step 442.

If it was determined at the test step 465 that a conversational tier must not be changed, processing proceeds to a test step 475, where it is determined whether the user response or a journal entry obtained at the step 440 represents an important user event. If so, processing proceeds to a step 480, where the system chooses a special reaction, as explained elsewhere herein (see, for example, FIG. 1 and the accompanying text with the discussion on the Important Reactions tier). After the step 480, processing proceeds to a test step 485, where it is determined whether the user ends the conversational session. Note that the test step 485 may be independently reached from the test step 475 if it was determined that user response does not represent an important user event. If it is determined at the step 485 that the user has ended the conversational session, processing is complete; otherwise, processing proceeds to a step 490, where the aggregated priority values obtained at the step 460 are used to choose system response rules. After the step 490, processing proceeds to a step 492, where the system builds a response, as explained elsewhere herein (see, for example, FIG. 2 and the accompanying text). After the step 492, processing proceeds to a step 495, where a system message is displayed to the user. After the step 490, processing proceeds back to the test step 430, explained elsewhere herein, which can be independently reached from the step 425.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations, conversational sessions and functions of chatbots may vary from the illustrations presented herein. Further, various aspects of the system described herein may be implemented using integration with various messenger applications and social networks and may be deployed on various devices, including, but not limited to smartphones, tablets and other mobile computers. Smartphones and tablets may use operating system(s) selected from the group consisting of: iOS, Android OS, Windows Phone OS, Blackberry OS and mobile versions of Linux OS. Mobile computers and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for a chatbot to maintain a conversation with a user, comprising:
    providing a plurality of separate conversational tiers that allow the chatbot to interact with the user, each of the conversational tiers having a separate set of production rules that are independent of production rules for other ones of the tiers, each of the separate sets of the production rules indicating a flow of conversation between the user and the chatbot for only a corresponding one of the tiers;
    the chatbot determining a selected tier by selecting one of the plurality of conversational tiers based on previous conversational tiers used by the chatbot in connection with conversing with the user and based on content of conversations between the user and the chatbot;
    the chatbot maintaining an important reactions tier for identifying and adequately responding to significant user events, the important reactions tier being maintained in addition to the selected tier;
    the chatbot responding to statements of the user according to a specific production rule that is chosen by the chatbot based on the selected tier and the important reactions tier and on at least one of: user level and depth of knowledge about the user, answers already used by the chatbot during a session, keywords extracted from a user message and other linguistic properties of the message, specific topics and keywords that the user brought up in a previous session, and personal profile data of the user, wherein the chatbot uses the important reactions tier to provide a special reaction that is different from and supersedes a reaction provided in connection with the selected tier, wherein the conversational tiers include a Journaling Conversation tier in which the user is prompted to talk about what the user did during the day as well as current mood and feeling, wherein the significant events of the user include marriage, baby birth, purchasing a new house, vacation, a birthday of the user, a business meeting, a business trip, a job promotion, a start of a new job and quitting an old job, and wherein the significant events are extracted from a journal entry when in the Journaling Conversation tier.

2. A method, according to claim 1, wherein the conversational tiers also include a Small Talk Tier to illustrate general capabilities of the chatbot to the user, and a Get to Know You tier that captures knowledge about the user along with user preferences and habits.

3. A method, according to claim 2, wherein the chatbot uses the Small Talk tier when the user first converses with the chatbot.

4. A method, according to claim 2, wherein the chatbot identifies and provides responses for the significant user events in connection with rules of the important reactions tier.

5. A method, according to claim 1, wherein the significant user events are also extracted from at least one of: user messages, user profile data, or conversation history.

6. A method, according to claim 1, wherein identification of the significant user events is based on fuzzy matching of a user input message onto a set of sample messages defining various circumstances and events.

7. A method, according to claim 1, wherein each of the production rules includes a set of conditions that are matched to conversation of the user and a resulting conversational portion that is provided by the chatbot when a corresponding one of the rules is selected.

8. A method, according to claim 7, wherein a particular rule is selected in response to the particular rule satisfying a greatest number of conditions without any of the conditions of the particular rule being false.

9. A method, according to claim 7, wherein the production rules include basic rules with no variables and schematic rules that use variable conversation portions.

10. A method, according to claim 9, wherein one of the basic rules includes a response that refers to notions that were mentioned in a previous conversation.

11. A method, according to claim 9, wherein a particular one of the variable conversation portions is chosen based on content of the statements of the user.

12. A method, according to claim 11, wherein the content of the statements of the user is analyzed using a selective conversational model trained on pairs of input and output messages that ranks a plurality of alternative responses based on a specific user message that contains a particular word or phrase.

13. A method, according to claim 1, wherein at least some of responses for schematic rules are synthesized using machine learning and natural language processing.

14. A method, according to claim 1, wherein a scripting engine matches statements of the user with specific ones of the production rules.

15. A method, according to claim 14, wherein the scripting engine causes transitions to a different conversational tier based on conditions that are not satisfied in a current conversational tier.

16. A chatbot that maintains a conversation with a user, comprising:

a non-transitory computer-readable medium containing data for a plurality of separate conversational tiers that allow the chatbot to interact with the user, each of the conversational tiers having a separate set of production rules that are independent of production rules for other ones of the tiers, each of the separate sets of the production rules indicating a flow of conversation between the user and the chatbot for only a corresponding one of the tiers; and executable code provided in the non-transitory computer readable medium, the executable code determining a selected tier by selecting one of the plurality of conversational tiers based on previous conversational tiers used by the chatbot in connection with conversing with the user and based on content of conversations between the user and the chatbot, the executable code maintaining an important reactions tier for identifying and adequately responding to significant user events, the important reactions tier being maintained in addition to the selected tier, and the executable code responding to statements of the user according to a specific production rule that is chosen by the chatbot based on the selected tier and the important reactions tier and on at least one of: user level and depth of knowledge about the user, answers already used by the chatbot during a session, keywords extracted from a user message and other linguistic properties of the message, specific topics and keywords that the user brought up in a previous session, and personal profile data of the user, wherein the important reactions tier is used to provide a special reaction that is different from and supersedes a reaction provided in connection with the selected tier, wherein the conversational tiers include a Journaling Conversation tier in which the user is prompted to talk about what the user did during the day as well as current mood and feeling, wherein the significant events of the user include marriage, baby birth, purchasing a new house, vacation, a birthday of the user, a business meeting, a business trip, a job promotion, a start of a new job and quitting an old job, and wherein the significant events are extracted from a journal entry when in the Journaling Conversation tier.

17. A chatbot, according to claim 16, wherein the conversational tiers also include a Small Talk Tier to illustrate general capabilities of the chatbot to the user, and a Get to Know You tier that captures knowledge about the user along with user preferences and habits.

18. A chatbot, according to claim 16, wherein each of the production rules includes a set of conditions that are matched to conversation of the user and a resulting conversational portion that is provided by the chatbot when a corresponding one of the rules is selected.

19. A chatbot, according to claim 18, wherein a particular rule is selected in response to the particular rule satisfying a greatest number of conditions without any of the conditions of the particular rule being false.

20. A chatbot, according to claim 17, wherein the chatbot identifies and provides responses for the significant user events in connection with rules of the important reactions tier.

21. A chatbot, according to claim 16, wherein the significant user events are also extracted from at least one of: user messages, user profile data, or conversation history.

22. A chatbot, according to claim 16, wherein identification of the significant user events is based on fuzzy matching of a user input message onto a set of sample messages defining various circumstances and events.

* * * * *